United States Patent [19]
Yuyama et al.

[11] Patent Number: 5,964,374
[45] Date of Patent: *Oct. 12, 1999

[54] METHOD OF SUPPLYING DRUG AMPULES TO AN AMPULE FEEDERS OF AMPULE DISPENSER

[75] Inventors: Shoji Yuyama; Keita Yasuoka, both of Toyonaka, Japan

[73] Assignee: Kabushiki Kaisha Yuyama Seisakusho, Toyonaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/794,854

[22] Filed: Feb. 5, 1997

[30] Foreign Application Priority Data

Feb. 7, 1996 [JP] Japan ................... 8-021412

[51] Int. Cl.$^6$ ................................................. B65H 7/00
[52] U.S. Cl. ..................... 221/17; 221/6; 221/14; 221/274; 221/10; 364/478.04; 364/479.12
[58] Field of Search .................. 221/6, 8, 10, 14, 221/17, 19, 11; 414/273, 274; 364/478.3, 478.13, 478.14, 468.23, 478.04; 464/479.12

[56] References Cited

U.S. PATENT DOCUMENTS

| | | |
|---|---|---|
| 4,041,480 | 8/1977 | Boyle ........................................... 221/6 |
| 4,546,901 | 10/1985 | Buttarazzi ................................. 221/10 |
| 5,073,078 | 12/1991 | Merlo ........................................ 221/14 |
| 5,159,581 | 10/1992 | Agans ......................................... 221/9 |
| 5,174,454 | 12/1992 | Parkander ................................ 414/274 |
| 5,216,618 | 6/1993 | Arita ....................................... 414/274 |
| 5,405,048 | 4/1995 | Rogers et al. ............................. 221/11 |
| 5,468,110 | 11/1995 | McDonald et al. ...................... 414/268 |
| 5,597,995 | 1/1997 | Williams et al. .................. 364/478.13 |

*Primary Examiner*—William E. Terrell
*Assistant Examiner*—Patrick Mackey
*Attorney, Agent, or Firm*—Wenderoth, Lind & Ponack, L.L.P.

[57] ABSTRACT

A method of supplying ampules, stored in a container, to any of a plurality of feeders of an ampule dispenser which has run out or is short of ampules in stock. The ampules are supplied only after confirming that the ampules in the storage container are the kind to be supplied into the intended feeder. When any feeder of the ampule dispenser runs out or is short of ampules, a bar code on the ampule storage container is read by a bar code reader and compared with an identification code provided on the intended feeder. If they coincide with each other, the ampules in the container are supplied into the intended feeder.

2 Claims, 8 Drawing Sheets

METHOD OF SUPPLYING DRUG AMPULES TO AN AMPULE FEEDERS OF AMPULE DISPENSER

BACKGROUND OF THE INVENTION

This invention relates to a method of supplying drug the ampules to any of ampule feeders of an ampule dispenser that holds insufficient or no ampules in stock.

In hospitals, more than 600 kinds of ampules that hold different medications for injection are prescribed. This figure will increase still further as new drugs are developed. Some of them are used very frequently, while others are very rarely prescribed. It would be immensely troublesome and inefficient to manually collect all of the prescribed ampules.

Thus, it is an ordinary practice to select approximately 200 of the 600 kinds of ampules that are used most frequently and store them in an ampule dispenser so that only these 200 kinds of the most frequently used ampules can be collected automatically by the ampule dispenser. Such an ampule dispensing system is disclosed in Japanese Patent Application 7-69566.

This system has a plurality of ampule feeders that keep different kinds of ampules. Ampules ordered in prescriptions are discharged from the corresponding feeder into a tray. The tray is then sent to an inspection station. It is not necessary to transfer the ampules from one tray to another.

Since the ampule dispenser keeps only frequently used ampules, each ampule feeder will soon run short or out of ampules in stock. When a certain feeder has insufficient or no ampules in stock, a pharmacist checks a tag on the feeder that indicates the name of the ampuled drug stored in the depleted feeder, collects ampules of the same kind stored in the depleted feeder from an ampule storage box in a drug storage, and supplies them to the feeder.

Ampuled medications for injection are highly active drugs, and an incorrect medication could kill a patient. Thus, they have to be handled with extreme care, especially considering the fact that some ampules are very similar in shape and size or completely the same in shape and size with only their contents being different, even though they contain completely different types of drugs. Moreover, some of these ampules contain very powerful drugs.

One problem with the above-described automatic ampule dispenser is that even if ampules to be stored in one feeder are put in a feeder next to the intended feeder, this fact can be detected only in the final inspection stage.

Although such automatic ampule dispensers are becoming indispensable in handling large quantities of ampules smoothly and efficiently, they have no means for positively preventing ampules from being supplied into wrong ampule feeders.

That is, whether or not the correct ampules are supplied into the correct feeders is checked only visually by pharmacists. There is no double-check means which can prevent human errors.

An object of this invention is to provide a method of supplying the correct ampules to the ampule feeders of an automatic ampule dispenser with the highest reliability.

SUMMARY OF THE INVENTION

According to this invention, there is provided a method of supplying ampules into each of a plurality of ampule feeders of ampule dispenser. The feeders store different kinds of ampules. The method comprising finding a particular feeder which has run out or is short on a stock on ampules, reading a bar code attached to an ampule storage container to determine whether or not the container stores ampules of the kind to be supplied into the particular container, and supplying ampules in the container into the particular feeder if the ampules in the container are judged to be of the kind to be supplied into the particular feeder.

Each feeder may be replenished with ampules either when it runs out or is short on ampules in stock. If feeders are to be replenished when they run out of ampules, the fact that each feeder has run out of ampules is detected by subtracting the number of ampules dispensed, which is measured by a sensor, from the number of ampules in the feeder when the feeder is full. Thus, the fact that an individual feeder has run out of ampules is detected automatically.

When each feeder runs short of ampules in stock, it is not necessary to supply ampules soon. Preferably, at the end or beginning of the day's work, the feeders are checked visibly and any feeder that is short on ampules is replenished with new ampules.

When any feeder is found out to be short or out of ampules, the name of ampules to be supplied into this feeder is indicated on a display, and a container that stores ampules to be supplied into this feeder is taken out of a drug storage shelf. The bar code on this container is read to check if the container actually contain samples to be supplied into the depleted feeder.

Whether or not the container contains the right kind of ampules may be checked by comparing the bar code on the container with the data on the display. Ampules in the container may be supplied into the intended feeder if the bar code on the container coincides with an identification code of ampules to be supplied into the intended feeder. In this case, the bar codes are automatically compared with each other.

If the container is judged to contain the right kind of ampules in either of the above two ways, ampules may be immediately supplied into the intended feeder. However, if a plurality of feeders is arranged in columns, it is impossible to immediately supply ampules into the feeders in the lower rows. In this case, if the bar code on the container indicates that the ampules in the container are of the kind to be supplied into the particular feeder, permission to supply ampules into the particular feeder is displayed, and the particular feeder is moved to a front replenishing position, unlocked and pulled out for replenishment of ampules.

In another arrangement, the bar code on the container and bar codes provided on feeders to be replenished with ampules are read, and ampules in the container are supplied into the feeders to be replenished with ampules if the bar code on the container coincides with the bar codes on the feeders to be replenished with ampules. With this arrangement, it is possible to more positively prevent feeders from being replenished with the wrong ampules.

Other features and objects of the present invention will become apparent from the following description made with reference to the accompanying drawings, in which:

BRIEF DESCRIPTION OF THE DRAAWINGS

DETAILED DESCRIPTION OF THE PREFERRED EMBODIMENT

An embodiment of this invention is described with reference to the drawings.

Figure 1:
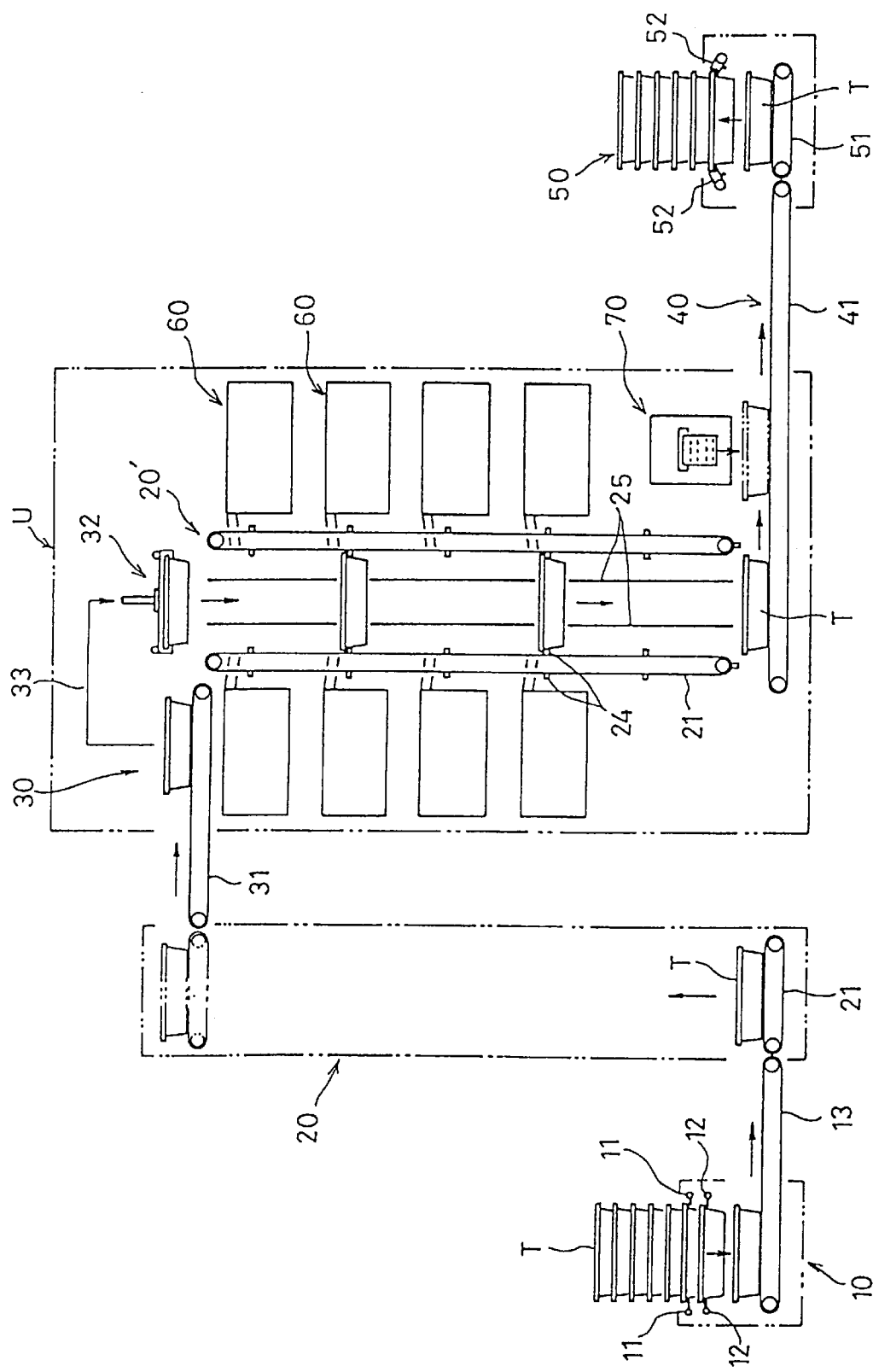
FIG. 1 is a schematic view showing how ampules are collected at an inspection station of an ampule dispensing system including the ampule dispenser.
Figure 2:
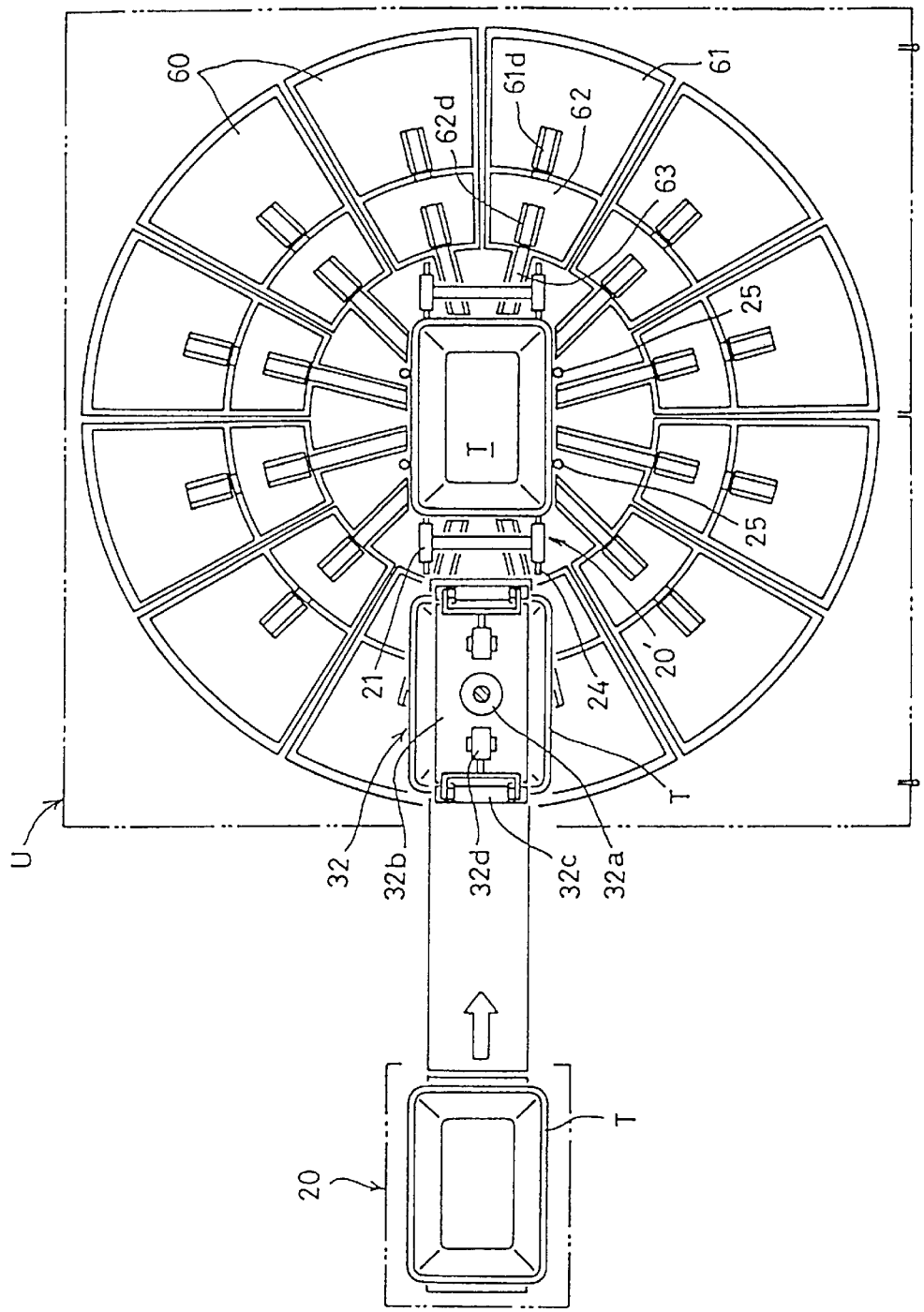
FIG. 2 is a plan view of the ampule dispenser.

FIG. 1 schematically shows an entire ampule conveyor line including an ampule dispenser to which the method of this invention is applied. FIG. 2 is a plan view of the ampule dispenser. The conveyor line comprises a tray supply unit 10 for feeding trays T one by one, a tray lift 20 for lifting trays T to a predetermined height, a horizontal mover 30 for horizontally moving trays T, downward mover 20' for moving trays T downward along ampule feeders 60 which are arranged in columns, a tray feeder 40 for receiving trays T from the downward mover 20' and feeding them to a predetermined position, and a tray stacker 50 for stacking trays T at the delivery end of the feeder 40.

The illustrated conveyor line and ampule dispenser are mere examples. Their detailed structures are neither shown nor described.

The tray supply unit 10 comprises a tray stacking unit having two rotary catches 11, 12, and a conveyor 13. The rotary catches 11, 12 rotate separately from each other. The lower catch 12 is rotated with all the trays T but the lowermost one is supported on the upper catch 11 to drop the lowermost tray onto the conveyor 13. The lower catch 12 is then rotated back to the position where it can support trays. In this state, the upper catch 11 is rotated to drop the trays T and support them on the lower catch 12. This operation is repeated to drop trays T one by one onto the conveyor 13.

The tray lift 20 has a short conveyor 21. While not shown, it can be raised to a predetermined height by e.g. a threaded shaft. Otherwise, the conveyor 21 may be placed on a table which can be raised by a chain or a rod.

The horizontal mover 30 comprises a conveyor 31, a tray catcher 32 for picking up a tray T, and a driving unit 33 (detailed structure not shown) for lifting, moving horizontally and lowering a tray as shown by the arrow. The catcher 32, as well as the downward mover 20' and the feeders 60, are described with reference to FIG. 3.

The tray catcher 32 has a vertically movable rod 32a having a clamping plate 32b mounted to the bottom end thereof. The clamping plate 32b has claws 32c on both sides. By activating cylinders 32d, mounted on the clamping plate 32b, the claws 32c are pivoted about pins 32e.

The tray catcher 32 is horizontally reciprocated between the position where the clamping plate 32b is over the delivery end of the conveyor 31 and the position where the clamping plate is right over the downward mover 20'. With a tray T sitting on the delivery end of the conveyor 31, the catcher 32 is moved to the position where the clamping plate 32b is right over the tray T, and the rod 32a is lowered until the clamping plate 32b abuts the top of the tray T. In this state, the pair of claws 32c are closed so as to engage a top flange F of the tray T.

With the claws 32c engaging the flange F, the rod 32a is raised in order to pick up the tray T from the conveyor 31.

The catcher 32 is then moved horizontally to the position right over the downward mover 20', and lowered to a predetermined height. In this state, the claws 32c are opened to drop the tray T.

As shown in FIG. 2, the downward mover 20' comprises a front pair and a rear pair of vertical belt conveyors 21, each of the front and rear pairs being laterally spaced a distance equal to the width of trays T. Each belt conveyor 21 comprises an upper and a lower pulley 22 and a belt 23 extending between the pulleys 22. The belt 23 of each belt conveyor 21 has catches 24 arranged at equal intervals for engaging the flange F of each tray T.

The catches 24 of the downward mover 20' receive trays T which are dropped from the catcher 32. The trays T, received by the catches 24, are moved downward by moving the belts 23 in the direction of the arrows in FIG. 1.

Around the downward mover 20', a plurality of ampule feeders 60 are provided in a plurality of columns.

In the embodiments, ampules are stored in feeders 60. But other types of drugs such as vials, tablets or capsules may be stored.

Figure 3:
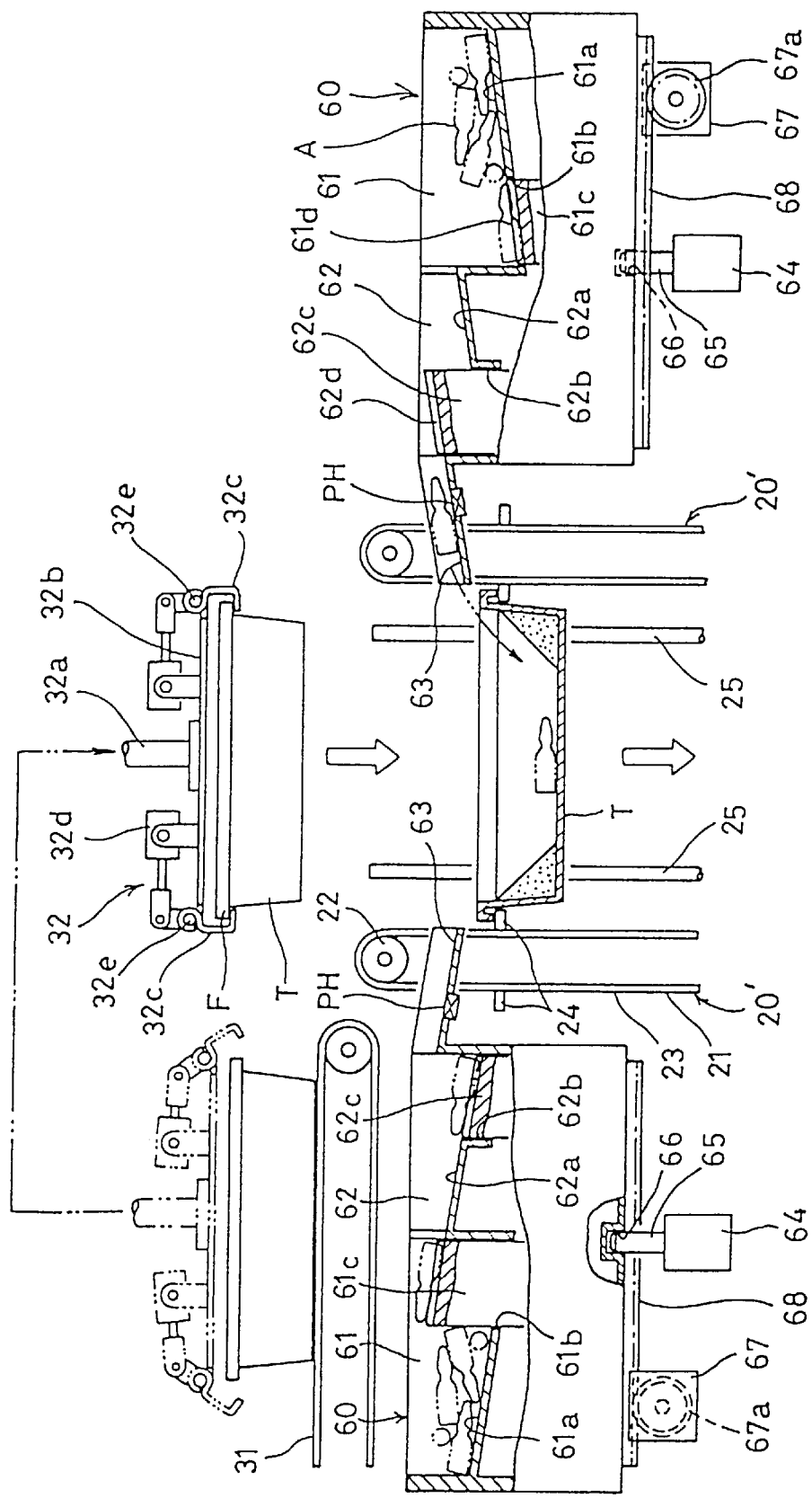
FIG. 3 is a detailed sectional side view of the ampule dispenser.
Figure 4:
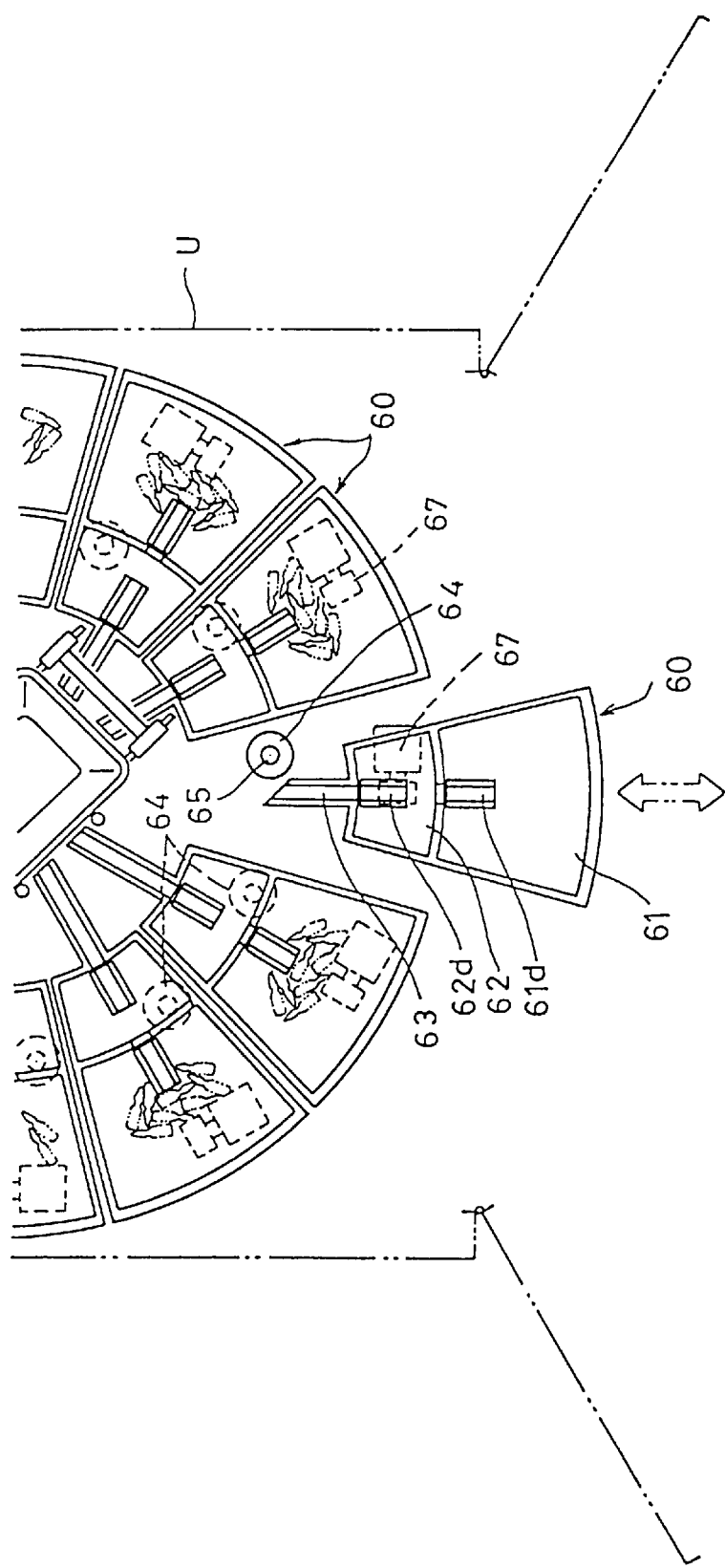
FIG. 4 is a view showing how ampules are discharged from ampule feeders.

As shown in FIG. 3, each feeder 60 comprises a main chamber 61 and a sub-chamber 62 connected to the front side of the main chamber 61. The chambers 61, 62 have bottom walls 61a, 62a sloping downward toward the path along which trays are fed downward. Holes 61b and 62b are formed in the bottom walls 61a and 62a, respectively, near their lower ends. First and a second pushers 61c and 62c are vertically movable through the holes 61b and 62b, respectively. The pushers 61c and 62c have top surfaces 61d and 62d sloping downwardly toward the tray feed path. Each top surface can support one capsule at a time.

With one ampule A supported on the top surface 61d, the first pusher 61c is pushed up until the top surface 61d becomes flush with the bottom wall 62a of the sub-chamber 62 to let the ampule slide down into the sub-chamber 62.

In this state, the second pusher 62c is lowered to let the ampule in the sub-chamber 62 slide down onto the top surface 62d. The second pusher 62c is then pushed up to its limit to discharge the ampule through a discharge chute 63 which is connected to the front end of the sub-chamber 62.

A sensor PH, for detecting the passage of ampules A, is provided in the discharge chute 63. When the sensor PH detects the passage of a predetermined number of ampules A, the first and second pushers 61c and 62c are deactivated.

Under each feeder 60, as shown in FIG. 3, there are provided a motor 67 for pushing the feeder 60 out at a replenishing station to resupply ampules in the feeder, and a feeder locking means 64 for keeping the feeder locked in the original position after it has been replenished with ampules and moved back to the original position.

FIG. 3 shows a pinion 67a which is rotated by the motor 67, and a rack 68 in mesh with the pinion 67a. The feeder locking means 64 comprises a solenoid having a solenoid rod 65 inserted in a recess 66 formed in the bottom of the feeder 60 to lock the feeder 60.

The ampule dispenser has a control unit for activating a feeder that stores selected ampules to discharge ampules therefrom.

Before activating the feeder, a tray T sitting on the delivery end of the conveyor 31 is picked up by the tray catcher 32, sent to a position over the downward mover 20', dropped into the downward mover 20', and lowered by the downward mover 20' to an position where its opening is right under the discharge chute 63 of the selected feeder 60.

When an unillustrated sensor detects that the tray has been brought into the above position, the control unit activates the feeder in order to discharge ampules A into the discharge chute 63.

The ampules discharged into the chute 63 slide down the chute 63 and are discharged into the tray T. When a required number of ampules A have been discharged into the tray T, the downward mover 20' is activated to lower the tray T. When the tray T is deposited on the feed end of the conveyor 40, it is moved to deliver the tray T to the tray stacker 50.

The tray stacker 50 comprises a short conveyor 51 for receiving trays from the conveyor 41 of the feeder 40, an unillustrated lift for lifting the conveyor 51, and rotary support claws 52 provided at a predetermined height. The tray stacker 50 is provided in a hospital pharmacy near an inspection station (not shown).

Provided along the tray feeder 40 is a printer 70 for printing drug lists based on prescriptions and putting them in trays T. It is said that about 600 kinds of ampules are used in hospitals. Of these 600 kinds, the upper rotary catch can store only about 200 kinds of them that are used more frequently than the others.

The other less frequently used ampules are usually stored in unillustrated drug boxes placed on shelves. When these ampules are needed, a pharmacist takes the necessary ones out of the drug boxes and places them in trays. They are sent to and inspected at the inspection station X.

Figure 5:
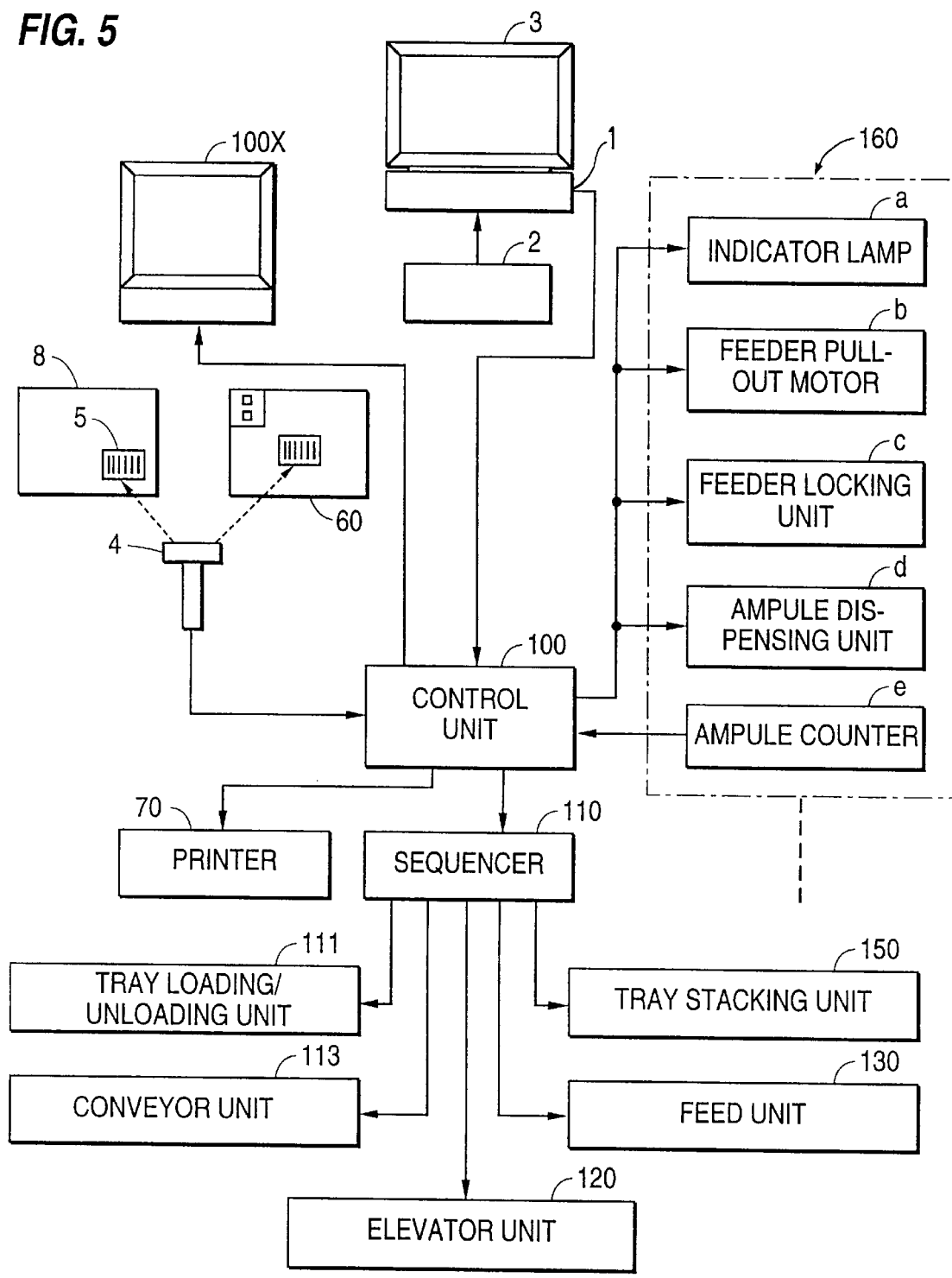
FIG. 5 is a block diagram of the entire ampule dispensing system including the ampule dispenser.

FIG. 5 shows a block diagram of the entire ampule dispensing system. As shown, the control unit 100 controls various components of the ampule dispensing system. A host computer 1 is connected to the control unit 100. When prescription data for each patient is inputted through its external input 2, such data is displayed on a display 3 and simultaneously sent to the control unit 100. The control unit 100 controls the entire system based on this data.

Upon receiving the prescription data, the control unit 100 checks if necessary ampules are stored in the ampule dispenser U by referring to code characters stored in a master memory (provided in the control unit 100), and then discharges the necessary ampules.

Each feeder 60 has a feeder driver 160. The feeder driver 160 includes a indicator lamp a, a feeder pull-out motor b, a feeder locking unit c, an ampule dispensing unit d, an ampule counter e, and a display 3. When the number of ampules in the feeder decreases below a predetermined level, the lamp a is turned on, and the motor b is activated to pull the feeder 60 radially outwardly of the drum from its normal position to supply ampules therein.

After being replenished with ampules, the feeder is pushed back to the normal position and locked in this position by the locking unit c. In order to move a feeder that needs replenishment to a predetermined replenishing station, the entire drum may be rotated through a predetermined angle by e.g. a motor which is activated by pressing a button or according to a program.

Figure 6:
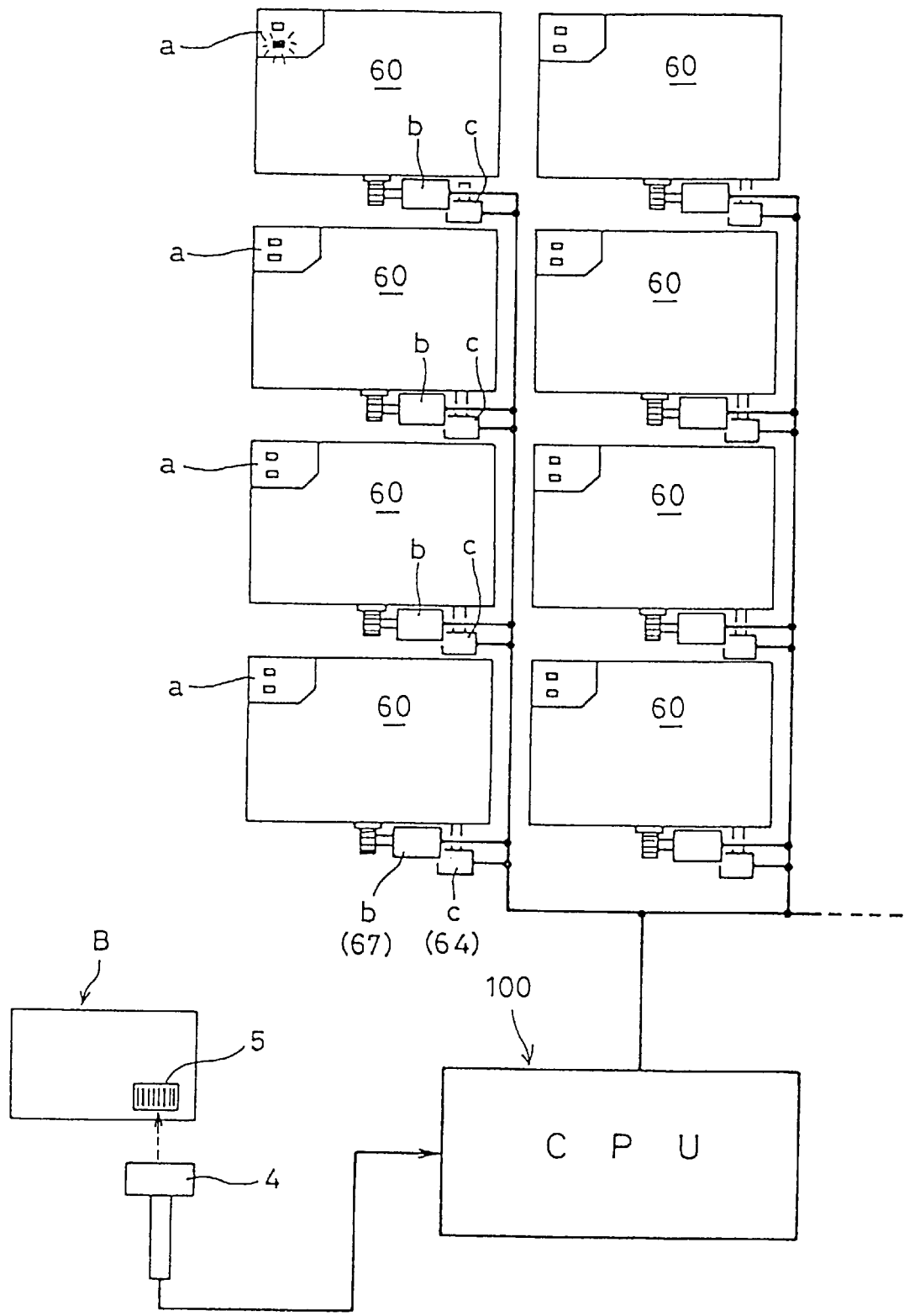
FIG. 6 is a view showing how a bar code on an ampule storage container is read by a bar code reader.

FIG. 6 shows feeders 60 and their driving circuits (a–c).

In a normal mode, the control unit 100 discharges ampules by controlling the ampule dispensing unit d and ampule counter e of a selected feeder. Ampules are discharged by moving the first and second pushers 61c and 62c in the above-described manner. The ampule counter counts the number of ampules passing by the sensor PH.

The ampule dispenser U is operatively associated with the tray supply unit 10, tray lift 20, horizontal mover 30, downward mover 20', feeder 40 and tray stacker 50.

The control unit 100 controls the entire system through a sequencer 110. Specifically, the sequencer 110 rotates the upper and lower rotary catches 11, 12 through a tray loading and unloading unit 111, drives the conveyors 13 and 41 at predetermined timings through a conveyor unit 113, moves trays in the lift 20 and downward mover 20' by driving motors through an elevator unit 120, and moves the conveyor 31 and the tray catcher 32 in the direction of arrows through a feed unit 130.

A tray stacking unit 150 controls the conveyor 51 of the tray stacker 50, its unillustrated lift, and the rotary claw pair 52. The control unit 100 directly controls the printer 70 to prepare drug lists by printing prescription data and other necessary data.

A bar code reader 4 is used to read bar codes 5 on ampule storage container B and bar codes on separate boxes in which ampules are kept for replenishment.

As the necessary ampules are discharged from the ampule dispenser U, ampules in a feeder or two will eventually run short.

When ampules in any feeder run out or run short, new ampules are supplied into this feeder.

Ordinarily, the lamp a is turned on when there still remains enough ampules so that there is no need to stop the ampule dispenser U immediately when the lamp a of any feeder is illuminated.

With this arrangement, it is possible to replenish any feeder 60 whose lamp a is turned on with ampules, not immediately after the lamp is turned on, but e.g. when the day's work has ended or the next day before starting the system. To replenish any feeder with ampules, the control mode is changed over from a normal position to a replenishing position by the control unit 100. The replenishing mode is explained with reference to the flowchart of FIG. 7.

Figure 7:
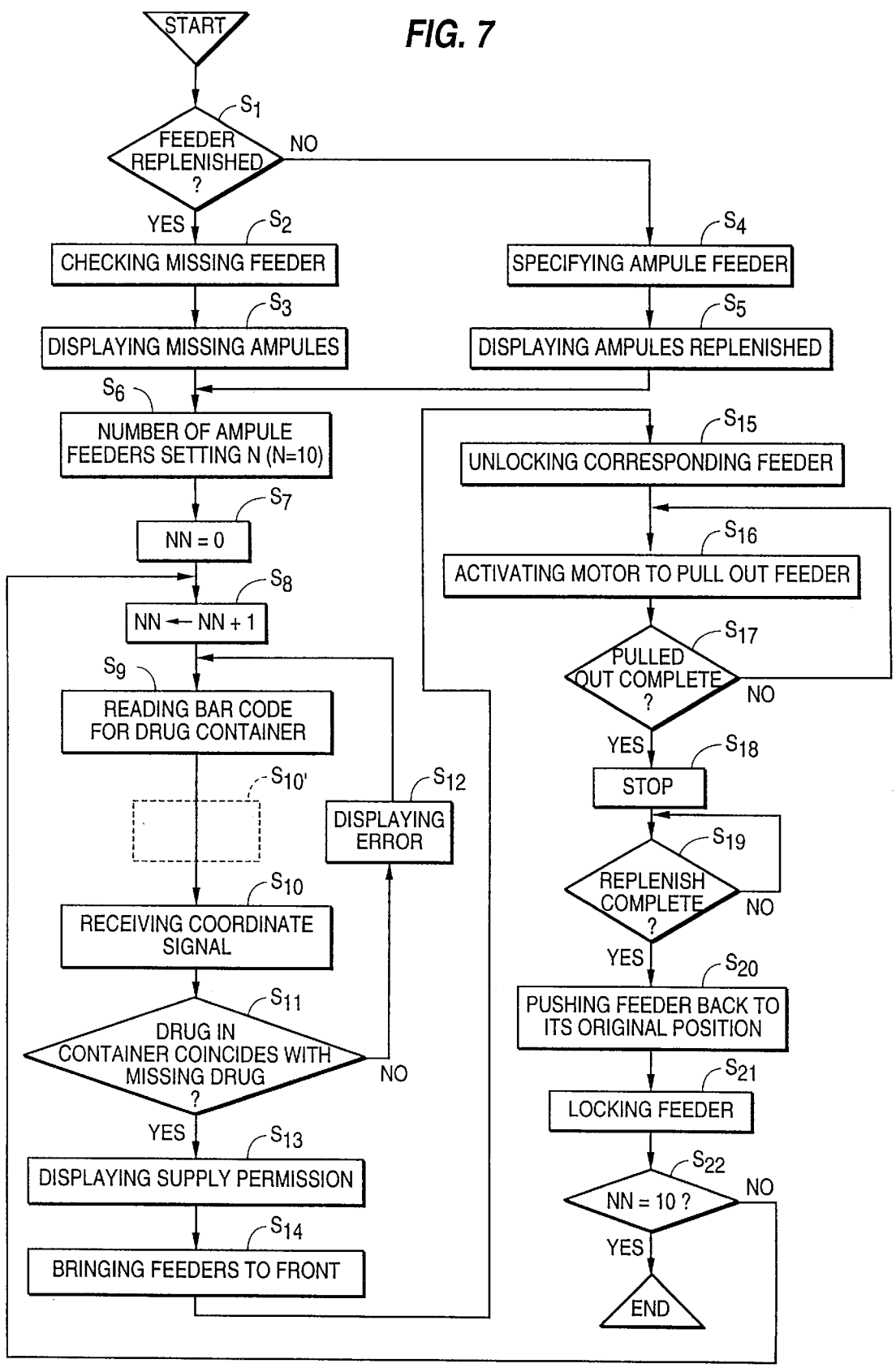
FIG. 7 is a flowchart showing one embodiment of a method of supplying ampules into each ampule feeder.

New ampules are supplied to a feeder 60 when it runs out or is short on ampules. In the embodiment of FIG. 7, feeders that have run out of ampules and feeders that have run short on ampules are replenished separately. But they may be replenished all at once.

In Step S1, it is determined whether each feeder is to be replenished with ampules when it runs out of ampules or is short on ampules. In the former case, the control unit searches any feeder that has run out of ampules in Step S2, and if it finds such a feeder, it displays its number and the name of ampules to be replenished in Step S3.

If each feeder is to be replenished with ampules when it runs short of a stock of ampules, any feeder whose stock of ampules are in short supply is specified by an external signal input means such as a keyboard in Step S4, and the name of ampules to be replenished is displayed in Step S5.

When feeders 60 that have run out or are short of a stock of ampules are specified, the number N of such feeders are set in Step S6. (If the number N is 10, N=10 is set.) In Step S7, variable NN is set at NN=0. In Step S8, NN is incremented by 1 to NN=1. In Step S9, the bar code 5 of the drug storage container B is read by the bar code reader 4.

In Step S10, the control unit receives a signal on the coordinate position in the drum of the feeder to be replenished with ampules stored in the drug storage container B of which the bar code 5 has been read by the bar code reader 4, and in Step S11, determines if the bar code signal that represents the ampules in the container B coincides with the identification signal that represents ampules to be supplied into the feeder in point. If not, the control unit displays an error message (S12) and returns to Step S9 to reread the bar code 5. Step S10' is explained later.

If the above signals coincide, permission to supply ampules is given in step S13, and the drum is rotated to bring feeders to be replenished to the front replenishing position (S14). The order in which the plurality of feeders are brought to the replenishing position is determined so that they can be brought to the replenishing station one after another and replenished with ampules in the shortest possible time period by suitably allocating variables NN to the respective feeders or by programming.

When a feeder 60 to be replenished with ampules is brought to the front replenishing position, its feeder driving unit 160 is activated. That is, the feeder locking means 64 is unlocked by retracting the solenoid rod 65 (S15), the motor 67 is activated to pull out the feeder (S16), and when the feeder is pulled out completely (S17), it is stopped (S18).

With the feeder 60 pulled out, ampules in the container B whose bar code has been read by the bar code reader are put in the feeder. When this is done (S19), the motor is reversed to push the feeder back to its original position (S20), and the feeder is locked in position by the feeder locking means 64 (S21).

In Step S22, a determination is made if NN=10. Since NN is still 1, the program returns to Step S8, and variable NN is incremented by 1 to NN=2. The above operation is repeated until the NN is incremented to NN=10. That is, when variable NN becomes equal in Step S22 to the feeder number N set in Step S6 (which is 10 in the embodiment), the ampule replenishing mode ends.

In Step S18, i.e. when the feeder has been pulled out and stopped, the bar code on the container B may be reread to double-check if the ampules in the container b are the right kind.

Figure 8:
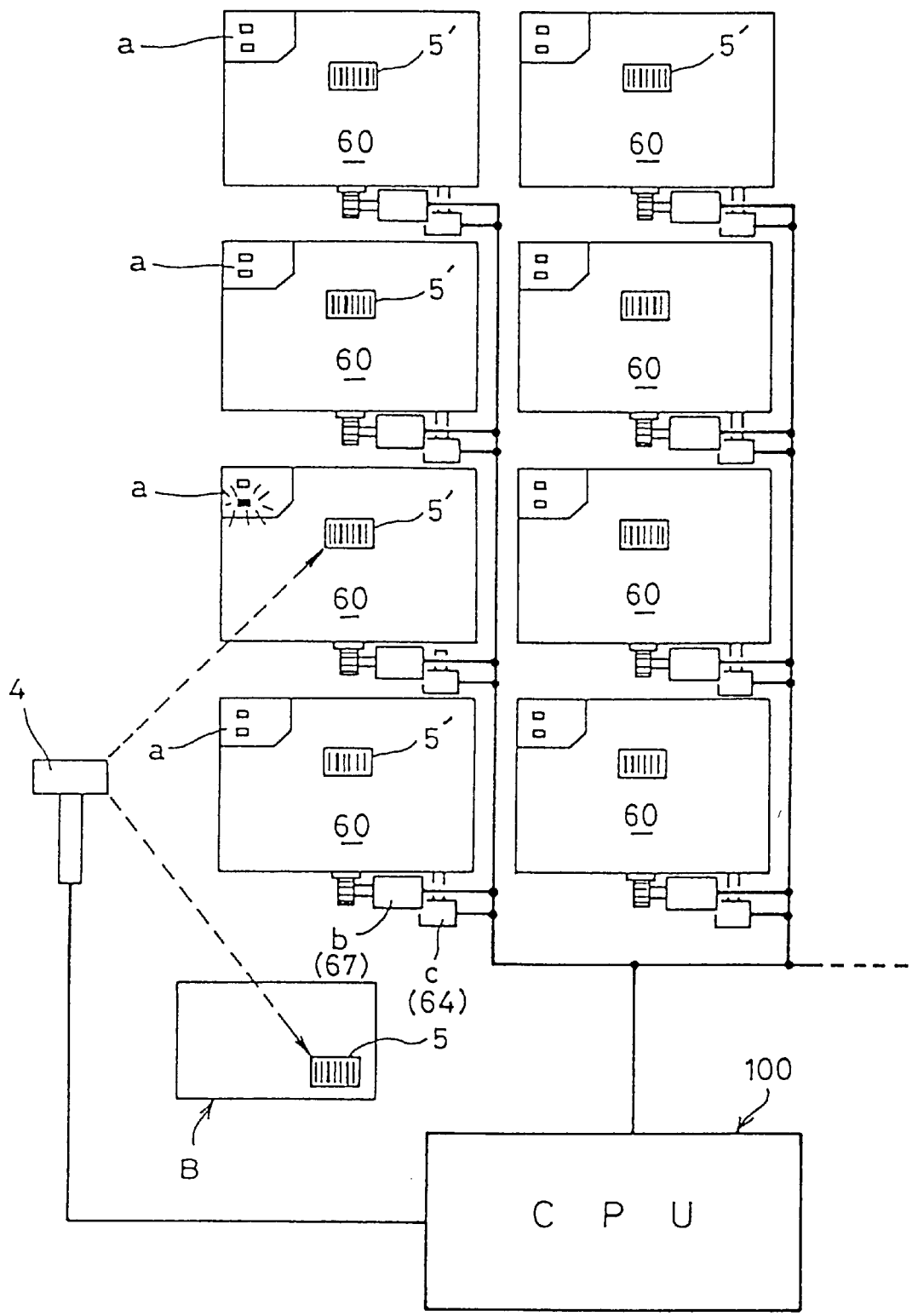
FIG. 8 is a schematic view showing a bar code reader and a plurality of feeders connected to a controller.

FIG. 8 shows a modified embodiment, in which each feeder 60 has a bar code 5' on its front panel. In Step S10' of the FIG. 7 flowchart, the control unit determines if the bar code on any feeder to be replenished with ampules coincides with the bar code on the container B to more positively prevent feeders from being replenished with wrong ampules.

Various necessary data are stored in the memory and can be displayed on the display at later dates or printed out so that one can check if feeders have been replenished with right kinds of ampules at any time.

Such printout lists should include at least the following data:

bar codes on ampule containers, bar codes on feeders, whether or not the above bar codes coincide, codes on ampules, and the number of ampules replenished, how feeders have been replenished (error signals due to bar code noncoincidence, reset signals, rereading of identification codes on ampule containers, elapsed time, etc.)

In the first invention, ampules are supplied into a feeder which have run out or are short of ampules if a bar code on an ampule container coincides with an identification code provided on the feeder. Thus, it is possible to eliminate the possibility of supplying ampules into e.g. a feeder next to the intended feeder.

According to the second invention, ampules are supplied into the intended feeder if the bar code on the ampule container coincides with an identification code of ampules to be supplied into the intended feeder. It is thus possible to automatically and quickly check if the container contains the right kind of ampules.

According to the third invention, if the bar code on the container indicates that the ampules in the container are of the kind to be supplied into the particular feeder, permission to supply ampules into the particular feeder is displayed, and the particular feeder is moved to a front replenishing position, unlocked and pulled out for replenishment of ampules. Since only the intended feeders are pulled out by checking the bar codes on the feeders, ampules can be supplied into the intended feeders with the highest efficiency.

In the fourth invention, the bar code on the container and bar codes provided on the feeders to be replenished with ampules are read, so that it is possible to more positively prevent feeders from being replenished with wrong ampules.

What is claimed is:

1. A device for supplying drug ampules to each of a plurality of ampule feeders of an ampule dispenser, said device comprising:

(a) a setting means for setting the number of said ampule feeders that need ampule replenishment;

(b) a bar code reader for reading a bar code attached to an ampule storage container;

(c) a receiving means for receiving a coordinate signal of each of said ampule feeders that need ampule replenishment and for receiving an identification signal identifying the type of ampules to be placed in each of said ampule feeders that need ampule replenishment;

(d) a means for determining whether or not ampules in the ampule storage container are of the same kind as the ampules to be supplied into one of said ampule feeders that need ampule replenishment by comparing the bar code with the identification signal;

(e) a display means for displaying authorization to supply ampules from said ampule storage container into said one of said ampule feeders that need ampule replenishment if the bar code and the identification signal match;

(f) a means for moving said one ampule feeder to an ampule supply position if the bar code and the identification signal match;

(g) an unlocking means for unlocking said one ampule feeder to allow said one ampule feeder to be supplied with ampules when said one feeder arrives at said ampule supply position;

(h) a locking means for locking said one ampule feeder after ampules have been supplied thereto; and (i) a counter/comparison means for counting the number of feeders into which ampules have been supplied and determining that all of the empty feeders have been replenished with ampules when the number of feeders counted exceeds the number set by said setting means.

2. The device as claimed in claim 1, wherein said feeder locking means comprises a solenoid having a solenoid rod.

* * * * *